2,967,803
PROCESS FOR THE PRODUCTION OF 17β-ACETOXYANDROSTENES

Gunther S. Fonken, Kalamazoo, and Herbert C. Murray, Barry Township, Barry County, Mich., assignors to The Upjohn Company, Kalamazoo, Mich., a corporation of Delaware No Drawing. Filed July 24, 1959, Ser. No. 829,197

13 Claims. (Cl. 195—51)

The present invention relates to a novel process for the production of 17β-hydroxysteroid esters, and more particularly to the microbiological conversion by fermentation of certain 20-ketopregnenes to the corresponding 17β-acetoxyandrostenes.

Degradation of the 17-side chain of 20-ketopregnenes to obtain the corresponding 17β-hydroxyandrostenes by microbiological conversion is already known in the art. However, since the 17β-acetates of the androstene series are generally preferred over the corresponding 17β-hydroxy compounds as therapeutic agents, for example, testosterone acetate is preferred over testosterone due to its longer physiological action, an additional acylation step is necessary in order to provide the 17β-acetate.

The present invention makes it possible to obtain the acetates of certain compounds of the androstene series directly from the corresponding 20-ketopregnenes by a one-step fermentation process, thus eliminating the additional acylation step heretofore necessary.

The process of the present invention comprises subjecting certain 20-ketopregnenes to the action of fungus of the genus Cladosporium or the oxidative enzymes thereof to produce the corresponding androstene 17β-acetate.

The process of the present invention is represented by the following formulate:

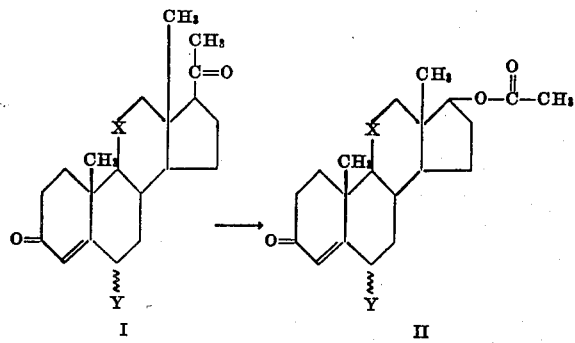

wherein X is selected from the group consisting of the methylene radical (>CH₂), the carbonyl radical (>C=O), the β-hydroxymethylene radical

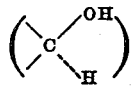

and the α-hydroxymethylene radical

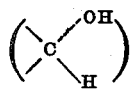

and Y is selected from the group consisting of hydrogen, α-methyl, β-methyl, α-fluoro, and β-fluoro.

In this application the wavy line ( ξ ) appearing at the 6-position is a generic expression denoting the alpha (α) configuration, the beta (β) configuration and mixtures thereof.

The 20-ketopregnene starting materials of the present invention are progesterone, 11β-hydroxyprogesterone, 11α-hydroxyprogesterone, 11-ketoprogesterone, 6α-methylprogesterone, 6β-methylprogesterone, 6α-methyl-11β-hydroxyprogesterone, 6β-methyl-11β-hydroxyprogesterone, 6α-methyl-11αhydroxyprogesterone, 6β-methyl-11α-hydroxyprogesterone, 6α-methyl-11-ketoprogesterone, 6β-methyl-11-ketoprogesterone, 6α-fluoroprogesterone, 6β-fluoroprogesterone, 6α-fluoro-11β-hydroxyprogesterone, 6β-fluoro-11β-hydroxyprogesterone, 6α-fluoro-11α-hydroxyprogesterone, 6β-fluoro-11α-hydroxyprogesterone, 6α-fluoro-11-ketoprogesterone, and 6β-fluoro-11-ketoprogesterone.

In the process of the present invention, the operational conditions, reaction procedure and details are those already known in the art of steroid bioconversion as illustrated by the Murray et al. U.S. Patent 2,602,769, issued July 8, 1952, utilizing, however, action of a species of fungus of the genus Cladosporium or the oxidative enzymes thereof. The genus Cladosporium according to Clements and Shear, Genera of Fungi, Hafner Publishing Co., New York, 1954, belongs to the family Macronemeae of the order Moniliales, of the class Fungi imperfecti. Among the species of the genus Cladosporium which are useful in the fermentation of steroids are:

- Cladosporium avellaneum
- Cladosporium carpophilum
- Cladosporium cladosporioides
- Cladosporium cucumerinum
- Cladosporium elatum
- Cladosporium fulvum
- Cladosporium herbarum
- Cladosporium macrocarpum
- Cladosporium mansoni
- Cladosporium resinae
- Cladosporium sphaerospermum
- Cladosporium trichoides
- Cladosporium variabile A tyical strain preferred for the practice of the invention is *Cladosporium resinae* (Lindau) de Vries f. avellaneum de Vries, available from the Northern Utilization Research Branch, U.S. Agricultural Research Service, Peoria, Illinois, Collection No. N.R.R.L. 2778. It is to be understood, however, that other Cladosporium strains of these species or the typical species mentioned above are suitable for the practice of this invention. Examples are *Cladosporium carpophilum* A.T.C.C. 12062 and *Cladosporium fulvum* N.R.R.L. 1671, available from the American Type Culture Collection and the Northern Utilization Research Branch, respectively.

Culture of the fungi, for the purpose and practice of the present invention, is in or on a medium favorable to the development of the fungi. Solid media can be utilized, but the preferred media are those which permit quantity growth under aerobic conditions. Moist solid particulate media, such as bran, cereal grains, cereal grits, wood chips, shavings, sawdust, cornhusks, fibrous material, such as copra, chestnuts, or lupine seeds can be used. These can be extracted with alcohol, ether or other organic solvents, to remove objectionable contaminants and growth inhibitors prior to fermentation. The carriers can optionally contain added growth factors and nutrients and can be used in layers or trays with or without auxiliary aeration, in towers as in the vinegar process or under conditions of agitation as for example by tumbling in a rotating drum. Liquid media, illustratively brewer's wort, are well adapted to use under aerobic layer or more especially aerobic submerged fermentation conditions. Suitably the media should contain sources of available carbon, nitrogen and minerals although there can be significant growth and development under less than optimum conditions.

Available carbon can be from carbohydrates, starches, gelatinized starches, dextrin, sugars, molasses as of cane, beet and sorghum, glucose, fructose, mannose, galactose, maltose, sucrose, lactose, pentoses, amino acids, peptones, or proteins. Glycerol, alcohols, acetic acids, sodium acetate, citric acid, sodium citrate, creosotes, lower fatty acids, higher fatty acids, or fats are illustrative of other materials which provide assimilable carbon for the energy requirements of the fungi. Mixtures of various carbon sources are sometimes advantageous.

Nitrogen in assimilable form can be provided by soluble or insoluble vegetable or animal proteins, soybean meal, lactalbumin, casein, egg albumin, peptones, polypetides or amino acids, urea, ammonium salts, ammonia trapped on base exchange resins or on zeolites, ammonium chloride, sodium nitrate, potassium nitrate, pyridine, morpholine, pyrrolidine, and the like. Whey, distillers solubles, cornsteep liquor, or yeast extract have been useful.

As mineral constituents the media or menstruum can contain, naturally present or added, available aluminum, calcium, chromium, cobalt, copper, gallium, iron, magnesium, molybdenum, potassium, scandium, uranium and vanadium. Sulfur can be provided by sulfates, alkyl sulfonates, sulfoxylates, sulfamates, sulfinates, free sulfur, hyposulfite, persulfate, thiosulfate, methionine, cystine, cystein, thiamin or biotin. Phosphorus, preferably pentavalent, suitably in a concentration at or about 0.001 to 0.07 molar and particularly at or about 0.015 to 0.02, can be present, suitably as ortho-, meta-, or pyrophosphates, salts or ester, phytin, phytic acid, phytates, glycerophosphate, sodium nucleinate, and/or cornsteep liquor, casein or ovovitellin. Boron, iodine and selenium in traces can be present or added especially after germination and early growth of the fungus.

Other accessory growth factors, vitamins, auxins and growth stimulants can be provided as needed or desired.

While solid or liquid media can be utilized, liquid media is preferred as it favors mycelial growth.

Suspending agents or mycelial carriers such as filter earths, filter aids, finely divided cellulose, wood chips, bentonite, calcium carbonate, magnesium carbonate, charcoal, activated carbon or other suspendable solid matter, methyl cellulose, carboxymethyl cellulose or alginates can be added to facilitate fermentation aeration and filtration.

The selected species of fungus is grown on a medium containing available carbon, illustratively carbohydrates, such as sugar or starches; assimilable nitrogen, illustratively soluble or insoluble proteins, peptones or amino acids; and mineral constituents, illustratively phosphates and magnesium sulfate; and other art recognized, desirable or adventitious, additions. The medium can desirably have a pH before inoculaton of between about 4 to 8 although a higher or lower pH can be used. A pH of between about 4 and about 6 is preferred for the growth of Cladosporium.

Inoculation of the fungal growth-supporting medium with the selected fungus of the genus Cladosporium can be accomplished in any suitable manner. Cladosporium grows over a range from about twenty to about 38 degrees centigrade, with a temperature between about 25 to about 32 degrees preferred.

The developmental period of fungal growth required before the steroid to be fermented is exposed to the fungus does not appear to be critical. For example, the steroid can be added either before thermal or other sterilization of the medium, at the time of inoculating the medium with the selected Cladosporium species, or at some time, for example, 24 to 48 hours, later. The steroid to be fermented can be added at any suitable concentration although for practical reasons steroid substrate at a concentration of about or up to about 0.6 gram per liter or even 0.8 gram per liter of medium is satisfactory and 2 grams per liter is operative although higher concentration depending on the particular steroid, can be used with some inhibition of mycelial development. The addition of steroid substrate to be fermented can be accomplished in any suitable manner especially so as to promote a large surface of contact of the steroid substrate with the oxygenating activity of the fungus, such as by dispersing the steroid substrate, either alone, with a dispersing agent, or in solution in an organic solvent by mixing or homogenizing a steroid substrate with a fungal medium to form a suspension or dispersion of steroid. Either submerged or surface culture procedures can be used with facility, although submerged culture is preferred. Alternatively, steroid fermenting enzymes of a growth of the fungus can be separated from the fungus or medium and admixed with the steroid or a solution of dispersion thereof, and the mixture subjected to aerobic conditions to accomplish fermentation of the steroid.

The temperature during the period of fermentation of the steroid can be the same as that found suitable for fungal growth. It need be maintained only within such range as supports life, active growth, or the enzyme activity of the fungus.

While any form of aerobic incubation is satisfactory for the growth of the selected fungus of fermenation of the steroid substrate, the efficiency of steroid fermentation is related to aeration. Therefore, aeration is usually controlled, as by agitation and/or blowing air through the fermentation medium. Aeration can be effected by surface culture or under submerged fermentation conditions. Aerobic conditions include not only the use of air to introduce oxygen, but also other sources or mixtures containing oxygen in free or liberatable form. In using air as the aerating medium, a desirable rate of aeration is about 2 to 40 millimoles and particularly 6 to 30 millimoles of oxygen per hour per liter of medium as determined by the method of Cooper, Fernstrom and Miller, Ind. Eng. Chem., 36, 504 (1944).

Aeration is suitably modified by using superatmospheric or subatmospheric pressures, for example, thirty pounds per square inch or ten pounds per square inch absolute. Oxygen uptake can be facilitated by the presence of various agents such as ascorbic acid, glutamic acid, citric acid, lactic acid, tyrosine, or tryptophane.

The time required for the fermentation of steroid varies somewhat with the procedure. When the steroid substrate is present at the time of inoculation of the medium, periods of from eight to 72 hours can be used. However, when the steroid is added to the fungus, after substantial aerobic growth of the fungal organism, for example, after sixteen to 24 hours at optimum temperature, the conversion of steroid substrate begins immediately and high yields are obtained in from one to 72 hours, 48 hours being generally satisfactory.

After completion of the steroid fermentation, the resulting fermented steroid is recovered from the fermentation reaction mixture. An especially advantageous manner of recovering the fermented steroid involves extracting the fermentation reaction mixture, including the fermentation liquor and mycelia with a water-immiscible organic solvent for steroids, for example, methylene chloride, chloroform, carbon tetrachloride, ethylene chloride, trichloroethylene, ether, amyl acetate, benzene, and the like. The fermentation liquor and mycelia can be separated and then separately extracted with suitable solvents. The mycelia can be extracted with either water-miscible or water-immiscible solvents, acetone being effective. The fermentation liquor, freed of mycelia, can be extracted with water-immiscible solvents. The extracts can be combined, dried, as for example over anhydrous sodium sulfate, and the purified fermented steroid obtained by recrystallization from organic solvents, by chromatography or both to isolate the 17-acetoxyandrostene from the other fermentative products.

In the following illustrative examples the strain N.R.R.L. 2778 has been used. Other strains and species of Cladosporium can be substituted therefor as previously stated, for example, Cladosporium carpophilum (A.T.C.C. 12062), Cladosporium fulvum (N.R.R.L. 1671), Cladosporium herbarum and the like.

EXAMPLE 1

Testosterone acetate

Ten liters of medium consisting of 1% glucose, 2% corn steep liquor (60% solids) and tap water, was adjusted to pH 4.8 with sodium hydroxide. Ten milliliters of lard oil was added to prevent foaming. The medium was sterilized at 15 lbs. pressure for 1 hour. Upon cooling, the sterile medium was inoculated with a 48-hour growth, from spores, of Cladosporium resinae (Lindau) de Vries f. avellaneum de Vries, N.R.R.L. 2778. The medium was agitated at 300 r.p.m. and sparged with sterile air at the rate of 0.5 l. of air per minute. After culturing at room temperature for 72 hours, there was added 2 g. of progesterone dissolved in 20 ml. of dimethylformamide. Fermentation of the progesterone was maintained for 48 hours. The fermentation broth was then extracted 3 times with 2.5 l. portions of methylene chloride. The methylene chloride extracts were combined, dried over anhydrous sodium sulfate and evaporated to give a crude residue containing testosterone acetate.

The crude extract residue was chromatographed over a 3.3 x 35 cm. Florisil synthetic magnesium silicate column, taking 335 ml. eluate fractions:

| Fraction | Solvent | Residue (mg.) | Comments and/or Assay |
|---|---|---|---|
| 1 | Skellysolve B [1] | | Oil. Discarded. |
| 2 | do [1] | 1,259 | |
| 3 | do [1] | | |
| 4 | 2% Acetone—Skellysolve B [1] | 1 | |
| 5 | do [1] | 174 | |
| 6 | do [1] | 42 | |
| 7 | 5% Acetone—Skellysolve B [1] | 13 | |
| 8 | do [1] | 0 | |
| 9 | do [1] | 188 | =Testosterone acetate. |
| 10 | 10% Acetone—Skellysolve B [1] | 353 | =Testosterone acetate+progesterone. |
| 11 | do [1] | 718 | Largely progesterone. |
| 12 | do [1] | 617 | Do. |
| 13 | 25% Acetone—Skellysolve B [1] | 128 | Do. |
| 14 | do | 32 | |
| 15 | do | 8 | |
| 16 | Acetone (2 l.) | trace | |

[1] Skellysolve B hexanes.

Fractions 8, 10, 11, and 12 were combined and rechromatographed over the same type of column:

| Fraction | Solvent | Residue (mg.) | Assay |
|---|---|---|---|
| 1 | Skellysolve B [1] (1 l.) | trace | |
| 2 | 2% Acetone—Skellysolve B [1] | trace | |
| 3 | do [1] | trace | |
| 4 | do [1] | trace | |
| 5 | 5% Acetone—Skellysolve B [1] | 11 | |
| 6 | do [1] | 31 | |
| 7 | do [1] | 113 | =Testosterone acetate. |
| 8 | do [1] | 245 | =Testosterone acetate+trace progesterone. |
| 9 | do [1] | 259 | =>2:1 Progesterone:Testosterone acetate. |
| 10 | do [1] | 293 | =Chiefly progesterone. |
| 11 | 10% Acetone—Skellysolve B [1] | 310 | |
| 12 | do [1] | 484 | |
| 13 | do [1] | 69 | |
| 14 | do [1] | 9 | |
| 15 | do [1] | 3 | |
| 16 | do [1] | 4 | |

[1] Skellysolve B hexanes.

Fraction 9 from the first chromatogram was combined with fractions 7 and 8 of the second chromatogram, and the material (total crude weight=546 mg.) was recrystallized from Skellysolve B hexanes to give 0.31 g. of testosterone acetate, M.P. 138.5–140° C. (L. Ruzicka and A. Wettstein, Helv. Chimica Acta, 18, 1264 (1935), report a melting point of 140–141° C. for testosterone acetate.)

In the same manner substituting 6α-methylprogesterone, 6β-methylprogesterone, 6α-fluoroprogesterone or 6β-fluoroprogesterone for progesterone and following the procedure of Example 1 is productive of 6α-methyltestosterone acetate, 6β-methyltestosterone acetate, 6α-fluorotestosterone acetate, and 6β-fluorotestosterone acetate, respectively.

EXAMPLE 2

11-ketotestosterone acetate

Ten liters of medium consisting of 1% glucose, 2% corn steep liquor (60% solids) and tap water, was adjusted to pH 4.8 with sodium hydroxide. Ten milliliters of lard oil was added to prevent foaming. The medium was sterilized at 15 lbs. pressure for 1 hour. Upon cooling, the sterile medium was inoculated with a 48-hour growth, from spores, of Cladosporium resinae (Lindau) de Vries f. avellaneum de Vries, N.R.R.L. 2778. The medium was agitated at 300 r.p.m., and sparged with sterile air at the rate of 0.5 l. of air per minute. After culturing at room temperature for 72 hours, there was added 2 g. of 11-ketoprogesterone dissolved in 50 ml. of dimethylformamide. Fermentation of the 11-ketoprogesterone was maintained for 72 hours. The fermentation broth was then extracted 3 times with 2.5 l. portions of methylene chloride. The methylene chloride extracts were combined, dried over anhydrous sodium sulfate and evaporated to give a crude residue containing 11-ketotestosterone acetate.

The crude extract residue was chromatographed over a 2.8 x 35 cm. Florisil synthetic magnesium silicate column, taking 335 ml. eluate fractions:

| Fraction | Solvent | Residue (mg.) |
|---|---|---|
| 1 | Skellysolve B [1] | 829 |
| 2 | Methylene Chloride | 100 |
| 3 | Skellysolve B [1] | 98 |
| 4 | 2% Acetone—Skellysolve B [1] | 17 |
| 5 | do [1] | 232 |
| 6 | do [1] | 12 |
| 7 | 5% Acetone-Skellysolve B [1] | 87 |
| 8 | do [1] | 42 |
| 9 | do [1] | 27 |
| 10 | 10% Acetone-Skellysolve B [1] | 126 |
| 11 | do [1] | 360 |
| 12 | do [1] | 56 |
| 13 | 25% Acetone-Skellysolve B [1] | 542 |
| 14 | do [1] | 572 |
| 15 | do [1] | 77 |
| 16 | Acetone | 150 |
| 17 | do | 63 |
| 18 | do | 46 |

[1] Skellysolve B hexanes.

Fraction 11 was recrystallized from acetone-Skellysolve B hexanes to give 0.26 g. of 11-ketotestosterone acetate, M.P. 167.5–169.5° C., $$\lambda_{max}^{EtOH}\ 238\ m\mu,\ a_M\ 15450$$

Analysis—Calcd. for $C_{21}H_{28}O_4$: C, 73.22; H, 8.19. Found: C, 73.41; H, 7.76.

In the same manner substituting 11β-hydroxyprogesterone, 11α-hydroxyprogesterone, 6α-methyl-11-ketoprogesterone, 6β-methyl-11-ketoprogesterone, 6α-fluoro-11-ketoprogesterone, 6β-fluoro-11-ketoprogesterone, 6α-methly-11β-hydroxyprogesterone, 6β-methyl-11β-hydroxypyrogesterone, 6α-fluoro-11β-hydroxyprogesterone, 6β-fluoro-11β-hydroxyprogesterone, 6α-methyl-11α-hydroxyprogesterone, 6β-methyl-11α-hydroxyprogesterone, 6α-fluoro-11α-hydroxyprogesterone, or 6β-fluoro-11α-hydroxyprogesterone for 11-ketoprogesterone is productive of the corresponding 11-oxygenated testosterone acetate, i. e., 11β-hydroxytestosterone 17-acetate, 11α-hydroxytestosterone 17-acetate, 6α-methyl-11-ketotestosterone acetate, 6β-methyl-11-ketotestosterone acetate, 6α-fluoro-11-ketotestosterone acetate, 6β-fluoro-11-ketotestosterone acetate, 6α-methyl-11β-hydroxytestosterone 17-acetate, 6β-methyl-11β-hydroxytestosterone 17-acetate, 6α-fluoro-11β-hydroxytestosterone 17-acetate, 6β-fluoro-11β-hydroxytestosterone 17-acetate, 6α-methyl-11α-hydroxytestosterone 17-acetate, 6β-methyl-11α-hydroxytestosterone 17-acetate, 6α-fluoro-11α-hydroxytestosterone 17-acetate, and 6β-fluoro-11α-hydroxytestosterone 17-acetate, respectively.

We claim:

1. A process for the production of 17β-acetoxytestosterones of the formula:

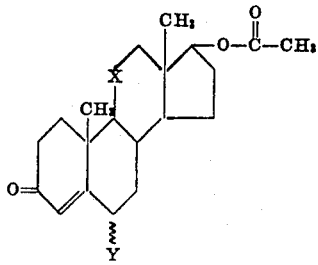

wherein X is selected from the group consisting of the methylene radical, the carbonyl radical, the α-hydroxymethylene radical and the β-hydroxymethylene radical, and Y is selected from the group consisting of hydrogen, fluoro and methyl, which comprises contacting a 20-ketopregnene of the formula:

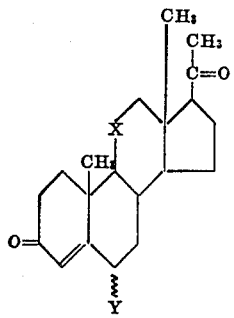

wherein X and Y are defined as above, to the oxidizing activity of a species of the fungus Cladosporium to produce the corresponding 17β-acetoxytestosterone.

2. A process for the production of testosterone acetate which comprises aerobically contacting progesterone to the oxidizing activity of the fungus *Cladosporium resinae* (Lindau) de Vries f. *avellaneum* de Vries N.R.R.L. No. 2778, in an aqueous nutrient medium under submerged fermentation conditions and continuing the fermentation until a substantial amount of testosterone acetate is formed.

3. A process according to claim 2 for the production of 6α-methyltestosterone acetate, wherein the starting material is 6α-methylprogesterone.

4. A process according to claim 2 for the production of 6α-fluorotestosterone acetate, wherein the starting material is 6α-fluoroprogesterone.

5. A process according to claim 2 for the production of 11-ketotestosterone acetate, wherein the starting material is 11-ketoprogesterone.

6. A process according to claim 2 for the production of 6α-methyl-11-ketotesterone acetate, wherein the starting material is 6α-methyl-11-ketoprogesterone.

7. A process according to claim 2 for the production of 6α-fluoro-11-ketotestosterone acetate, wherein the starting material is 6α-fluoro-11-ketoprogestrone.

8. A process according to claim 2 for the production of 11β-hydroxytestosterone 17-acetate, wherein the starting material is 11β-hydroxyprogesterone.

9. A process according to claim 2 for the production of 6α - methyl-11β-hydroxytestosterone 17 - acetate, wherein the starting material is 6α-methyl-11β-hydroxyprogesterone.

10. A process according to claim 2 for the production of 6α-fluoro-11β-hydroxytestosterone 17-acetate, wherein the starting material is 6α-fluoro-11β-hydroxyprogesterone.

11. A process according to claim 2 for the production of 11α-hydroxytestosterone 17-acetate, wherein the starting material is 11α-hydroxyprogesterone.

12. A process according to claim 2 for the production of 6α-methyl-11α-hydroxytestosterone 17-acetate, wherein the starting material is 6α-methyl-11α-hydroxyprogesterone.

13. A process according to claim 2 for the production of 6α-fluoro-11α-hydroxytestosterone 17-acetate, wherein the starting material is 6α-fluoro-11α-hydroxyprogesterone.

References Cited in the file of this patent

UNITED STATES PATENTS

| | | |
|---|---|---|
| 2,721,828 | Murray et al. | Oct. 25, 1955 |
| 2,902,410 | Weintraub et al. | Sept. 1, 1959 |